Nov. 12, 1968 G. C. BULL Re. 26,488

DISPENSING CONTAINER WITH COMPRESSED MASS DISCHARGING MEANS

Original Filed Jan. 24, 1964

INVENTOR.
GLEN C. BULL
BY
Pattison, Wright & Pattison
ATTORNEYS

United States Patent Office

Re. 26,488
Reissued Nov. 12, 1968

26,488
DISPENSING CONTAINER WITH COMPRESSED MASS DISCHARGING MEANS

Glen C. Bull, 2800 Quebec St. NW., Washington, D.C. 20008

Original No. 3,235,138, dated Feb. 15, 1966, Ser. No. 340,079, Jan. 24, 1964. Application for reissue Jan. 12, 1967, Ser. No. 617,426
3 Claims. (Cl. 222—263)

Matter enclosed in heavy brackets [ ] appears in the original patent but forms no part of this reissue specification; matter printed in italics indicates the additions made by reissue.

The present invention relates to containers and more particularly and specifically to storage containers for fluent materials.

It is a general object of the present invention to provide structural innovations in storage containers which function to afford substantial advantages over containers heretofore utilized for like purposes.

For example, in containers utilized for the storage of paints and like materials, product deterioration occurs when such materials remain in the containers after partial use or dispensing of the contents by reason of air contamination. The present invention provides structural improvements in such containers which eliminates this past problem.

Another example may be found in dispensing containers such as aerosol or simple gravity dispensers for fluents. Heretofore, such containers have had limited dispensing characteristics by reason of early exhaustion of loading gases or viscosity resistances to gravity flow. The present invention will function to improve containers of this type and purpose by eliminating the causes of malfunction inherent in prior structures.

Still another example is evidenced by dispensing containers for fluents required to be stored under pressure and out of contact with the atmosphere or other possible contaminants. Such materials include beer. The concepts of the present invention provide for substantial improvements in containers known in this specific art and enable the production and use of container forms not heretofore known or made available to the purchasing public.

Still additional examples of the applicability of the novel concepts of the present invention will become apparent from reading the description which follows hereinafter.

It is a more general object of the present invention to provide unique and improved concepts in container construction, primarily in container closures, and to the structural incorporation of novel principles contributing to unique function of container components.

It is a principal object of the present invention to provide in the container art, and principally, but not exclusively, in the container closure art, structures which advantageously utilize physical properties of compressible masses to attain function not heretofore attainable from prior container structures.

Another object of this invention lies in the utilization of a compressible mass as an element or reservoir of stored energy to either fill voids in containers left by partial dispensing of the contents thereof, or as a dispensing pressure source for the fluent contents of a container.

A further object of the present invention resides in the provision of structural elements, in combination, which function to preserve the contents of a partially full container against contamination by the ingress of the atmosphere or other foreign medium.

Still another object of this invention lies in the provision of structural elements, in combination, which function to establish a dispensing follower means for the contents of a container which serves also to eliminate contamination of the contents remaining after partial dispensing.

Another object of the present invention is the provision of structural components for the container art which serve to provide a positive dispensing force for container contents which is not dissipated by leakage or excessive pressure loss during partial dispensing operations.

A still further object of the present invention lies in the provision of unique components for the container art which are simple and inexpensive in design, manufacture and incorporation in containers, yet a structure which is durable and reliable in use and, in some instances, which is recoverable for reuse.

Still further objects and advantages of the present invention will become more readily apparent to one skilled in the art when the following general statement and description are read in the light of the accompanying drawings.

The nature of the basic concepts of the present invention may be described in general terms as relating to the incorporation in the container art of the combination of a flexible impervious bag within which is placed a compressible mass or medium, the expansion of which will serve to fill empty areas within a container and at the same time act as a dispensing force for the remaining fluent contents of the container.

Additionally, continuing in general terms, the concepts of the present invention broadly relate to the attachment of a flexible bag or like container to the inside face of a storage container closure and of including within the bag a compressible mass, such as a synthetic sponge, which in its relaxed state would substantially fill the entire cubic volume of the container, but which may be compressed within the flexible bag to a mass volume representing a negligible percent of the overall volume of the container, venting the interior of the bag containing the flexible, compressible mass to the atmosphere, compressing the mass within the bag and applying the closure to a container filled to capacity with a fluent material to be stored or dispensed.

Referring now to the accompanying drawings in which like numerals designate similar parts throughout the several views.

The present description, and the disclosures of the appended drawings, are intended to comprehensively disclose various operable embodiments of the present invention which may be readily modified to suit the necessities of a given use without departing from the broad concepts of the present invention.

Figure 1:
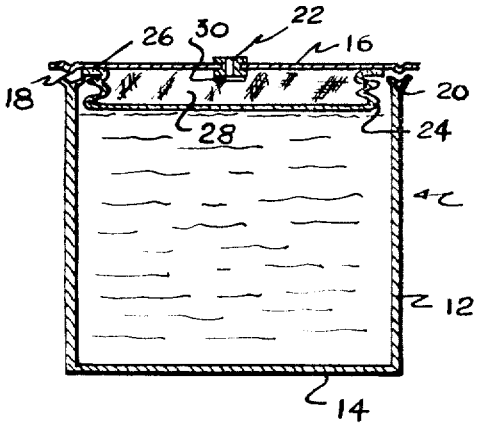
FIG. 1 is a vertical section illustrating one form of the concepts of this invention.

With particular reference to FIG. 1 of the drawings, there is disclosed a container 10, such as a paint can, which consists of the cylindrical side walls 12 and an integrally formed circular bottom wall 14, both of which are usual and common in the metallic can or container art. Associated with the can formed from the components hereinbefore identified in a closure lid 16 which is circular and may have a depending annular bead 18 to be frictionally engaged within a depending annular channel 20 formed about the open upper end of the container.

Within the planar surface of the container closure lid 16 there is formed a vent aperture 22 which opens from the underside of the container lid through the upper surface thereof. Associated with the closure lid is a flexible bag-like element 24 formed of pliable plastic material which is secured, as at 26, annularly to the underside of the container lid 16 inwardly of the locking bead 18 thereon to depend from the underside of the closure. Within the confined area formed between the depending flexible plastic bag element 24 and the underside of the container closure is positioned a compressible mass 28, such as synthetic sponge material, which normally completely fills the flexible member to a volume equal to or slightly in excess of the volume within the can or container element to which the closure is to be applied, as shown in dotted line.

Ordinarily, it is preferred that a small metallic screening are grill element 30 be secured within or over the inner end of the vent aperture to prevent compression of the stored mass into or outwardly through the atmospheric vent.

As is best illustrated in FIG. 1, the compressible mass is compressed upwardly against the underside of the container closure when the container is filled to its normal capacity with a fluent such as paint and the container closure is then locked onto the container through the medium of the interlocking beads and channels in typical closure fashion. When the container closure is removed the compressed mass will expand filling the flexible sheet or bag element. Upon removal of a portion of the fluent material from the container the compressible mass is compressed by hand pressure upwardly against the underside of the container closure whereupon the closure is returned to locked condition on the container. The compressed mass will then expand within the flexible bag element inside the container to fill that area above the level of the fluent remaining in the container driving therefrom outwardly through the interlocking bead and channel, or through vents provided therein (not shown), all of the ambient atmosphere which normally fills the container above the fluent level therein. In this manner all of the contaminating atmosphere is purged from the container and the contents remain in protected condition until such time as the container is again opened for use of additional contents, whereupon the aforedescribed method of reconditioning of the container is repeated.

Figure 2:
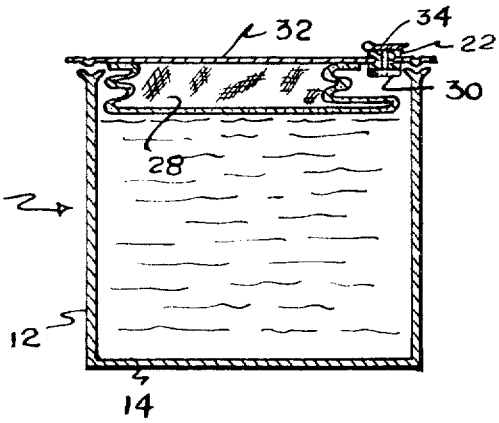
FIG. 2 is a view similar to FIG. 1 of another form of the invention.

In reference to FIG. 2 of the drawings there is shown a container 10 identical with that shown in FIG. 1 together with a container closure 32 substantially identical to that shown in FIG. 1 with the singular exception of a non-return check valve 34 provided in an atmospheric vent in the container closure externally of the periphery of the flexible material, which vent serves to permit egress of the ambient atmosphere from the container as described in respect to the foregoing embodiment. In this particular embodiment it is important to locate the non-return check valve inwardly from the peripheral edge of the closure so that the expanding mass within the flexible bag-like element will seal the non-return check valve before the fluent contents of the container are forced outwardly therethrough.

Figure 4:
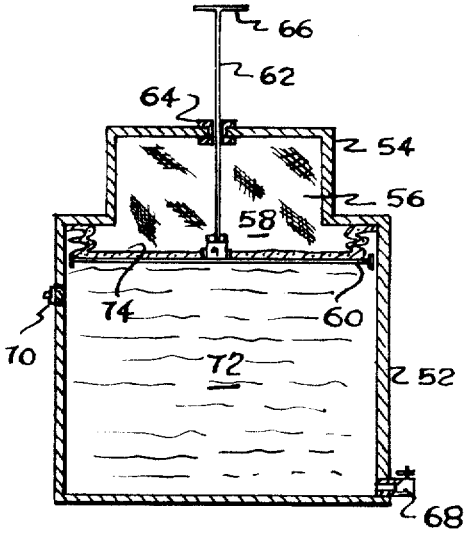
FIG. 4 is another view similar to FIG. 2 illustrating still a further form of the invention.
Figure 3:
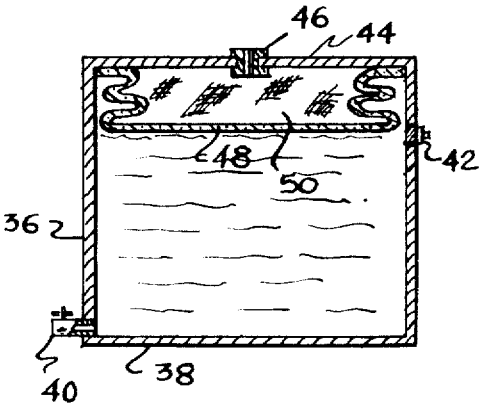
FIG. 3 is a view similar to FIG. 2 of still another form of the invention.

The embodiments shown in FIGS. 3 and 4 of the drawings relate to an adaptation of the concepts of the present invention to a liquid dispensing container such as one containing draft beer. It is a principal object of the concepts of this invention to provide for structural and functional improvemnts of containers which will permit the manufacture of a small metallic container for draft beer which may be used as a home dispensing unit within the usual home refrigerator. Recognizing that it is necessary to maintain carbonated beverages, such as beer, under a certain pressure within the container and to maintain them in chilled condition to prevent deterioration thereof, the embodiments shown in FIGS. 3 and 4 fully contemplate such pressurization as is necessary to maintain carbonation of the beer and to serve as a dispensing medium acting against such pressurized contents.

In the embodiment shown in FIG. 3 of the drawings a metallic container 36, of generally rectangular configuration, is provided adjacent the bottom wall 38 on one side thereof with a valved outlet or spigot 40 intended for the purpose of withdrawing the carbonated beverage from the container. A filling plug 42 usually threaded, is provided adjacent the top wall of the container in one side thereof, and the top wall 44 of the container is provided with an atmospheric vent 46 generally centrally located therein. Within the container and below the atmospheric vent 46, a flexible bag-like element 48 is secured to the underside of the top wall of the container following the peripheral configuration thereof and contains therein a mass of sponge-like material 50 which in its normal relaxed (expanded) condition is of a volume which will entirely fill the container.

The sponge material is of such a character that it will collapse under the charging pressure of the container within the flexible bag element upwardly against the top wall of the container when the container is filled to its normal full condition with a carbonated beverage through the filling plug therein. The expansion characteristics of the mass are such that it will expand as beverage is withdrawn from the outlet spigot and will maintain the carbonated beverage under dispensing pressure comparable to the charging pressure of the vessel. At the same time, vent 46 permits ingress of surrounding atmosphere at its atmospheric pressure into the contained mass thereby allowing the mass within its flexible container to fill the entire area of the vessel above the level of the charged beverage therein preventing contamination of the charged beverage by the ambient incoming atmosphere.

The embodiment of the invention as shown in FIG. 4 of the drawings consists of a modification of the form of the invention shown in FIG. 3 and described in respect thereto. In this embodiment the container 52' is of rectangular configuration and is provided centrally of the upper wall thereof with an upset portion 54 forming a rectangular cavity 56 centrally of the upper inner face of the wall in which is normally confined a compressed mass of intersticed material 58 such as has been hereinbefore described. Within the four vertical side walls of the container is a plate 60 of the same configuration as the bottom wall of the container, which plate is loosely mounted and secured centrally thereof to a lift rod 62 which extends vertically through the stored energy mass and outwardly of a central top atmospheric vent 64 in the upset top wall portion of the container. The extended end of the lift rod 62 is provided with a lift handle 66 at a point thereon a distance above the free plate 60 at least as great as the depth of the container from beneath the upset cavity portion to the bottom wall. The container, as that previously described, is provided with a valved spigot outlet 68 immediately adjacent the bottom thereof in one side wall of the container, and a filling plug 70 in one side wall thereof.

When adapting the aforedescribed container, for example, to the storage of draft beer, the lift rod is grasped and pulled vertically upwardly through the atmospheric vent to compress the stored energy mass upwardly within the recessed cavity in the top wall of the container. The container is then charged, through the filling plug, with the draft beer 72 under the necessary pressure required for proper storage of the beverage. Pressure is then released on the lift rod to permit the stored energy mass to bear downwardly under its expanding pressure against the free plate 60 within the container which in turn bears on the top surface of the draft beer contained therein placing it under discharge pressure. As in the previous embodiment, a flexible liner or bag 74 is secured to the under inside of the top wall of the container to completely underlie the stored energy mass and be interposed between said mass and the free plate. The flexible bag is of such a dimension as to permit it to fully fill the container above the free riding plate when the stored energy mass is completely expanded to its maximum volume.

It is fully contemplated that the fluent in the container may also be confined in a flexible, impervious bag to facilitate loading of the container and to afford additional protection against contamination.

It is further contemplated that any of the embodiments described may be modified by eliminating the atmospheric vent for the bag, in which event a gas generator such as Dry Ice would be placed in the bag with the intersticed mass when originally loading the container.

From the foregoing description of the several embodiments of the invention disclosed and described it is seen that a practical, workable and inexpensive arrangement has been provided for the storing and/or dispensing under pressure of various types of fluent materials within a rigid container. It is further readily seen that the methods and apparatus hereinbefore disclosed readily lend themselves to the storage of fluents free from contamination by the atmosphere, or by other charging fluent mediums necessary to create within the container a dispensing pressure for the ejection of the stored fluent.

While it is fully contemplated that various adaptations of the broad principles and concepts of the present invention may be readily evident to those skilled in the art, the concepts of this invention are not to be limited or restricted beyond the requirements of the prior art and the appended claims.

What I desire to claim is:

1. In combination with a container having contents therein, an impervious flexible bag within the container in contact with the contents thereof, a compressed mass of intersticed material in said bag, and said flexible bag containing a gas generating medium.

2. In combination with a dispensing container having an outlet therein, an impervious flexible bag having a volume substantially equal to that of said container a compressible intersticed mass *of spongy material* filling said bag, *when said bag is expanded,* said bag being fixed in said container substantially opposite said outlet, and *the interior of* said flexible bag being open externally of the container.

*3. In combination with a container having contents therein, an impervious flexible bag within the container, the exterior of the bag being in contact with the contents of the container, a compressible mass of intersticed spongy material in said bag, and the interior of said flexible bag being open to the atmosphere.*

References Cited

The following references, cited by the Examiner, are of record in the patented file of this patent or the original patent.

UNITED STATES PATENTS

| | | | |
|---|---|---|---|
| 274,698 | 3/1883 | Barcus | 222—340 |
| 642,960 | 2/1900 | Clibborn | 222—386.5 |
| 1,630,899 | 5/1927 | Lynch | 222—389 X |
| 1,977,862 | 10/1934 | Scholt | 222—386.5 |
| 2,283,100 | 5/1942 | Shores | 222—386.5 |
| 2,815,152 | 12/1957 | Mills | 222—386.5 |
| 2,883,180 | 4/1959 | Moulton | 267—5 |
| 3,075,576 | 1/1963 | Herbert | 222—386.5 X |
| 3,096,000 | 7/1963 | Staley | 222—386.5 X |
| 3,117,699 | 1/1964 | Epstein | 222—394 X |
| 2,852,033 | 9/1958 | Orser | 220—85 |
| 3,189,231 | 6/1965 | Kibbel et al. | 222—386.5 X |
| 3,224,345 | 12/1965 | Doetsch | 220—85 X |

STANLEY H. TOLLBERG, *Primary Examiner.*